US009679502B2

(12) United States Patent
Logan et al.

(10) Patent No.: US 9,679,502 B2
(45) Date of Patent: Jun. 13, 2017

(54) GRAPHIC DISPLAY ASSEMBLY

(71) Applicant: Target Brands, Inc., Minneapolis, MN (US)

(72) Inventors: Robert G. Logan, Blaine, MN (US); Sara L. Hayden, Manito, IL (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 14/935,685

(22) Filed: Nov. 9, 2015

(65) Prior Publication Data

US 2017/0132957 A1 May 11, 2017

(51) Int. Cl.
*G06F 15/00* (2006.01)
*G09F 7/08* (2006.01)
*G09F 7/18* (2006.01)

(52) U.S. Cl.
CPC ........ *G09F 7/08* (2013.01); *G09F 2007/1821* (2013.01); *G09F 2007/1847* (2013.01)

(58) Field of Classification Search
CPC ........ G09F 15/00; G09F 1/14; G09F 15/0056; G09F 3/20; G09F 7/18
See application file for complete search history.

(56) References Cited

U.S. PATENT DOCUMENTS 1,511,597 A 10/1924 Fergusson
1,813,557 A 7/1931 Zadek
1,852,315 A * 4/1932 Lamb ........................ G09F 1/14 40/607.1
1,924,858 A 8/1933 Hopp
2,070,652 A 2/1937 Elmer
3,217,436 A 11/1965 Van Wormer, Jr.
4,019,271 A * 4/1977 Latimer .................. E01F 9/688 116/63 P
4,329,800 A 5/1982 Shuman
4,537,316 A 8/1985 Simon et al.
4,557,064 A * 12/1985 Thompson ................ G09F 3/20 40/361
4,777,750 A 10/1988 Garfinkle
5,090,145 A * 2/1992 Chiang .................. A47G 1/065 40/605
5,331,757 A * 7/1994 Ernest ................. G09F 15/0012 40/607.1
5,486,044 A 1/1996 Bennett
5,625,969 A * 5/1997 Vogler ................ G09F 15/0012 40/611.12

(Continued)

OTHER PUBLICATIONS

Staples, "FFR® SuperGrip® H Clip", http://www.staples.com/FFR-Merchandising-1-inch-SuperGrip-H-Clip-Holds-Up-to-008-T-Clear/product_243661, at least as early as Nov. 6, 2015, 1 page.

*Primary Examiner* — Shin Kim
(74) *Attorney, Agent, or Firm* — Leanne Taveggia Farrell; Westman, Champlin & Koehler, P.A.

(57) ABSTRACT

A graphic display assembly includes a base having a top surface, a bottom surface and a plurality of spaced-apart holes extending through the base between the top surface and the bottom surface. A pillar extends from the top surface of the base and has at least one elongated channel. A sign has a portion that is held by the at least one elongated channel and a remaining portion extending outwardly from the pillar. The sign includes a bottom edge that is spaced apart from the top surface of the base.

19 Claims, 6 Drawing Sheets

(56) References Cited

U.S. PATENT DOCUMENTS

| | | | | |
|---|---|---|---|---|
| 5,906,064 | A * | 5/1999 | Field | G09F 7/08<br>248/558 |
| 5,911,523 | A | 6/1999 | Burchart | |
| 6,079,894 | A * | 6/2000 | Obitts | A61H 3/02<br>135/75 |
| 6,170,788 | B1 | 1/2001 | Stevenson | |
| 6,530,166 | B1 * | 3/2003 | Garfinkle | G09F 3/20<br>40/606.14 |
| 7,083,054 | B2 | 8/2006 | Squitieri | |
| 7,086,541 | B2 | 8/2006 | Robertson | |
| 7,274,555 | B2 | 9/2007 | Kim et al. | |
| 7,374,138 | B2 | 5/2008 | Marshall | |
| 7,553,103 | B2 * | 6/2009 | Jameson | E01F 9/692<br>116/63 R |
| D610,623 | S * | 2/2010 | Makhija | G09F 7/18<br>D20/43 |
| 7,823,311 | B2 * | 11/2010 | Pitcher | G09F 7/10<br>40/618 |
| 8,172,186 | B2 * | 5/2012 | Tsai | F16M 11/22<br>248/121 |
| 9,003,682 | B2 * | 4/2015 | Garfinkle | G09F 7/10<br>40/606.01 |
| 2007/0199222 | A1 * | 8/2007 | Turner | G09F 15/0037<br>40/607.02 |
| 2011/0214321 | A1 * | 9/2011 | White | B32B 38/00<br>40/606.01 |
| 2011/0214324 | A1 * | 9/2011 | White | B23P 19/00<br>40/611.06 |
| 2012/0110883 | A1 * | 5/2012 | White | G09F 7/18<br>40/606.01 |
| 2013/0008065 | A1 * | 1/2013 | Danielson | G09F 3/204<br>40/606.01 |

* cited by examiner

GRAPHIC DISPLAY ASSEMBLY

BACKGROUND

Retail stores use a variety of display fixtures to present products to customers for purchase and to provide signage for conveying and highlighting product information. These display fixtures can support the product and the signage. Exemplary display fixtures include tables, bins, open-air refrigerator coolers and other similar structures.

The discussion above is merely provided for general background information and is not intended to be used as an aid in determining the scope of the claimed subject matter.

SUMMARY

A freestanding graphic assembly includes a base having a top surface, a bottom surface and a plurality of spaced-apart holes extending through the base between the top surface and the bottom surface and arranged in a pattern. A pillar extends from the top surface of the base and has at least one elongated channel. A sign includes a portion being held by the at least one elongated channel and a remaining portion extending outwardly from the pillar. The sign includes a bottom edge that is spaced apart from the top surface of the base.

A freestanding graphic assembly includes a support stand having a base including a top surface and a bottom surface and an elongated member that extends upwards from the top surface of the base and houses a clip. The base further includes a plurality of spaced-apart holes extending through the base between the top surface and the bottom surface. A graphic has a portion retained by the clip in the elongated member and a remaining portion that extends outwardly from the elongated member. The elongated member is located adjacent to one of two opposing ends of the base.

A method of altering an open-air refrigerator cooler display unit to include a graphic display assembly is provided. A portion of a sign is inserted into a portion of a support stand. The support stand includes a base having a top surface, a bottom surface and a plurality of spaced-apart holes extending through the base between the top surface and the bottom surface and arranged in a pattern. A pillar extends from the top surface of the base and has at least one elongated channel for receiving the portion of the sign. The support stand is placed on a table top of the open-air refrigerator cooler display unit. The plurality of spaced-apart holes in the base of the support stand are aligned with holes in the tabletop that deliver refrigerated air to the display unit so that perishable food that is placed on the table top and over the base of the support stand will continue to be evenly cooled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A freestanding graphic assembly is to be used in an open-air refrigerator cooler display case or in other types of display fixtures including tables and bins. As illustrated, the open-air cooler includes a table top that has holes for allowing refrigerated air to pass through to cool the perishable food being supported by the table top. The table top is surrounded by sidewalls so as to retain food and at least some cold air on the table top and prevent food from rolling off.

The freestanding graphic assembly described in detail below includes a support stand having a flat base and a pillar that extends upwards from the flat base. The base includes holes for matching with the holes in the tabletop of the open-air cooler. This allows the freestanding graphic assembly to be placed anywhere on the table top and still allow refrigerated air to pass through the base to food being placed on top of the base. Inside the pillar is an elongated "H" clip. An in-store marketing sign or graphic is secured to the "H" clip so that it is located above the sidewalls of the refrigerator cooler and above the perishable food being supported on the tabletop of the refrigerator cooler.

Figure 1:
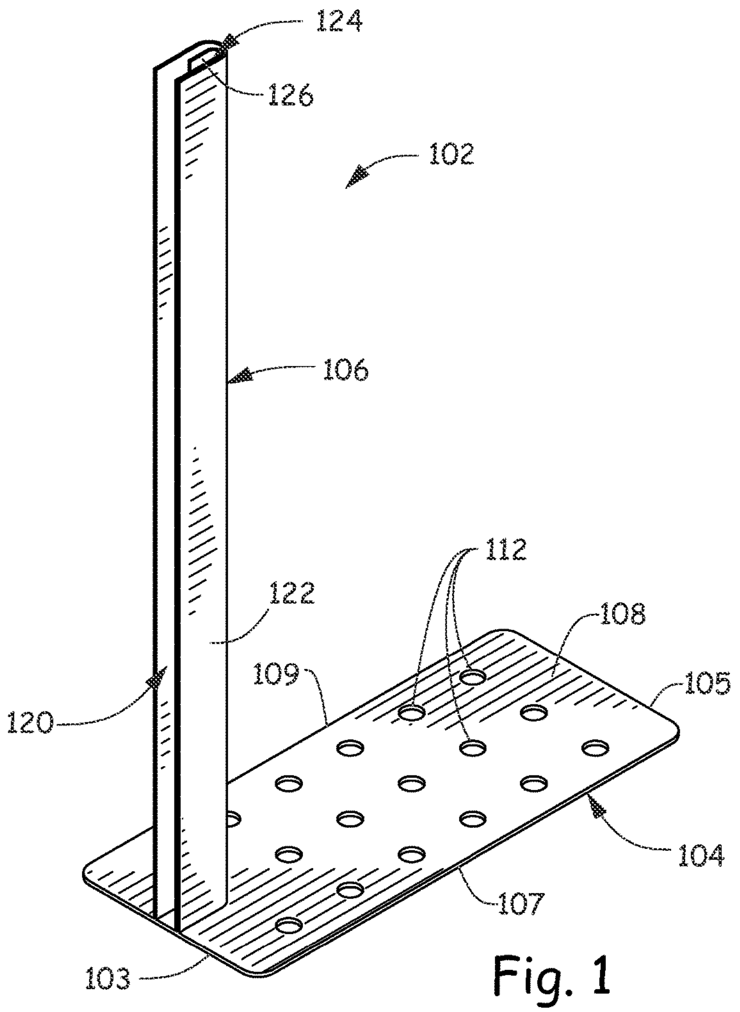
FIG. 1 is a perspective view of a support stand according to one embodiment.
Figure 2:
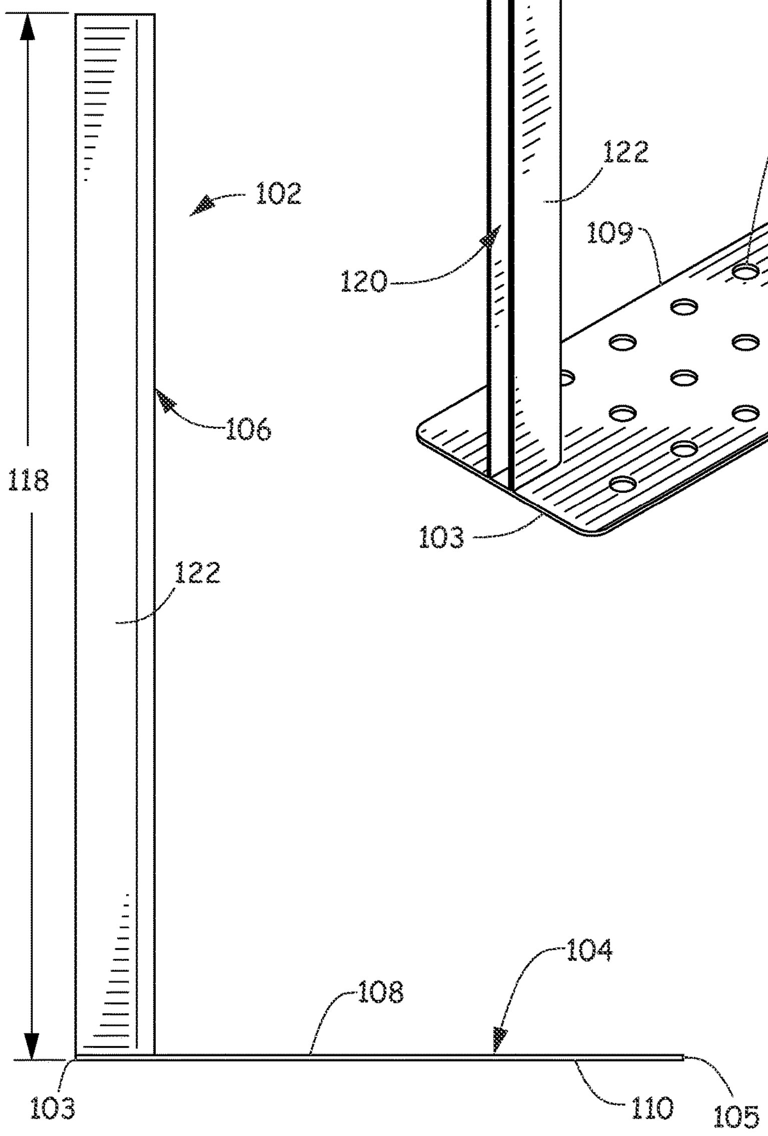
FIG. 2 is a right side view of FIG. 1.
Figure 3:
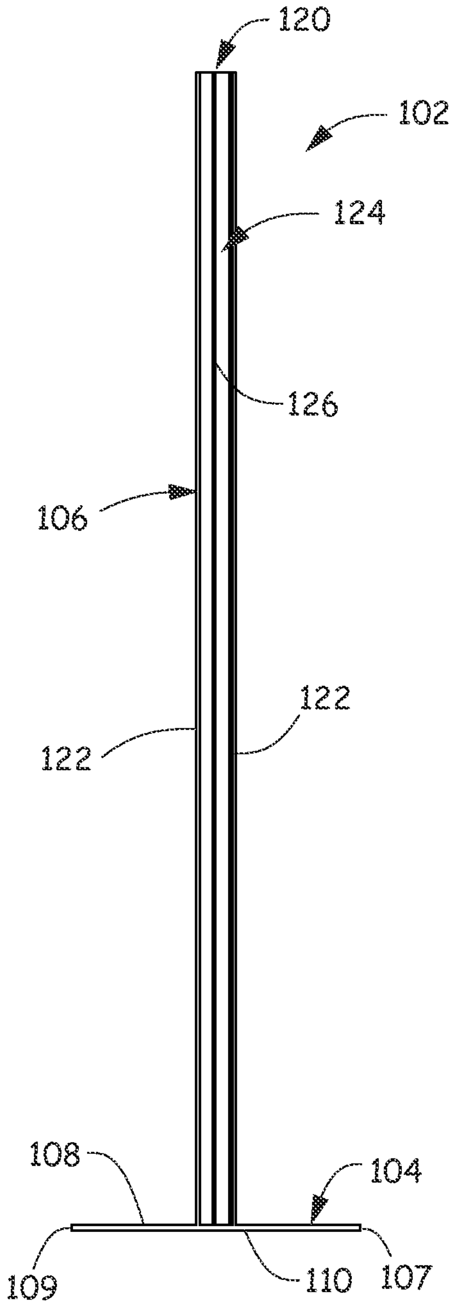
FIG. 3 is a front view of FIG. 1.
Figure 4:
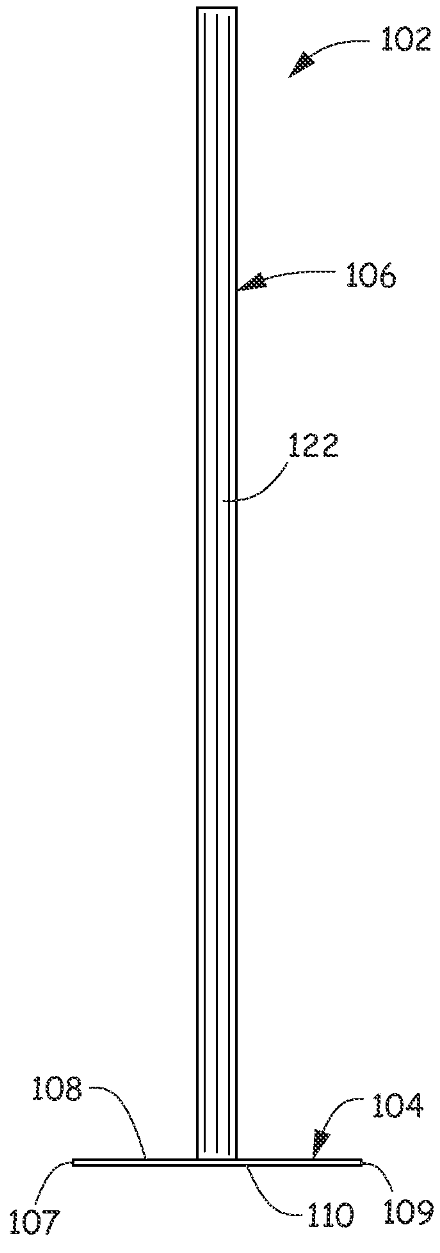
FIG. 4 is a back view of FIG. 1.
Figure 5:
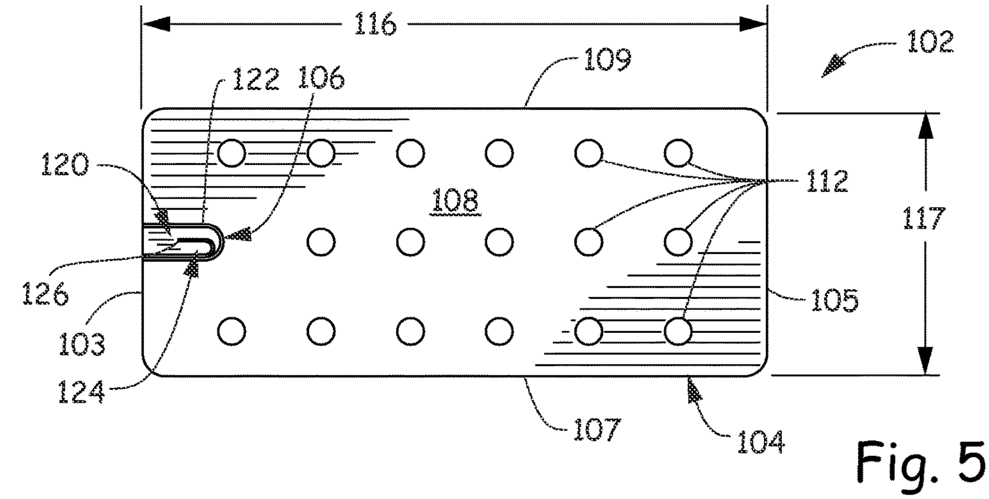
FIG. 5 is a top view of FIG. 1.

FIG. 1 is a perspective view of a support stand 102 according to one embodiment. FIGS. 2-5 illustrate a right side view (the left side view being a mirror image), a front view, a back view and a top view of support stand 102. Support stand 102 includes a base 104 and a pillar or elongated member 106. Base 104 is a flat, planar body formed into a rectangular shape and having a top surface 108 and a bottom surface 110 located opposite top surface 108. Base 104 further includes a front end 103, a back end 105, a first side end 107 and a second side end 109. Side ends 107 and 109 connect front end 103 to back end 105 to form the rectangular shape. Base 104 includes a plurality of holes 112 that extend through base 104 between top surface 108 and bottom surface 110 and are arranged in a pattern. As shown in the embodiment illustrated in FIGS. 1-5, the plurality of holes 112 in base 104 are arranged in rows. In particular, when viewing base 104 from the top view illustrated in FIG. 5, there are three horizontally aligned rows and six vertically aligned rows. In each horizontally aligned row there are five or six holes. In each vertically aligned row there are two or three holes.

Pillar or elongated member 106 extends upwards from top surface 108 of base 104 and has at least one elongated channel. More particularly, pillar or elongated member 106 extends from top surface 108 adjacent to front end 103 of base 104. However, pillar or elongated member 106 could also extend from top surface 108 adjacent to back end 105 or in any other location on base 104. Length 116 and width

117 (FIG. 5) of base 104 are sized relative to height 118 (FIG. 2) of pillar or elongated member 106 and relative to the weight of base 104 so that support stand 102 is stable and can support the weight of a graphic without tipping over, being easily knocked over or bumped into a new position. The at least one elongated channel of pillar 106 includes an outer channel 120 having an outer wall 122 and an inner channel 124 defined between an inner wall 126 and a portion of outer wall 122.

Figure 6:
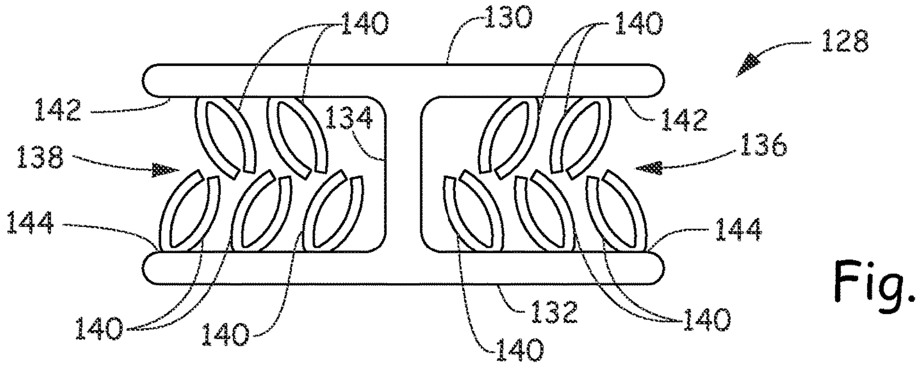
FIG. 6 is an enlarged end view of a clip according to one embodiment.
Figure 7:
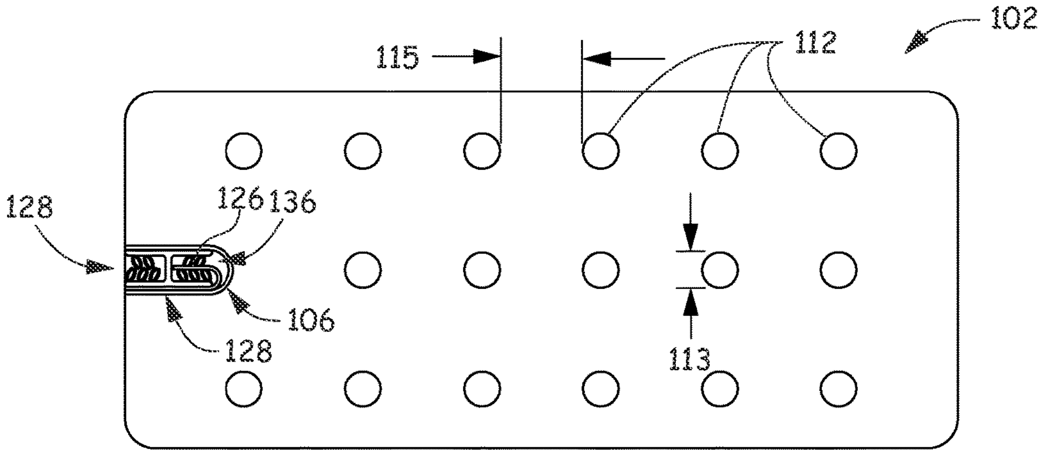
FIG. 7 is an enlarged top view of the sign support stand of FIG. 1 and the clip of FIG. 6 assembled together.
Figure 8:
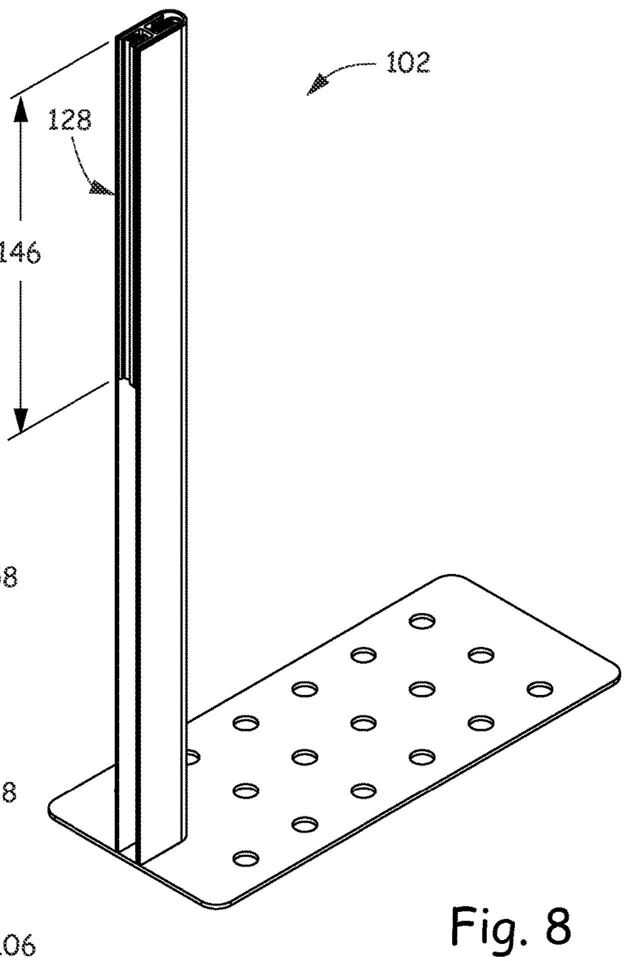
FIG. 8 is a perspective view of FIG. 7.

Pillar or elongated member 106 houses a clip 128 that is to be used to retain a graphic or a sign in pillar 106. FIG. 6 is an enlarged end view of clip 128 according to one embodiment. FIG. 7 is an enlarged top view of sign support stand 102 and clip 128 assembled together. FIG. 8 is a perspective view of FIG. 7. Clip 128 is an elongated clip (as shown in FIG. 8) housed in a portion of pillar or elongated member 106 by mating with inner channel 124 and outer channel 120. As illustrated in FIG. 8, clip 128 includes a height 146 that is less than a height 118 of pillar 106.

As illustrated in FIG. 6, clip 128 is an "H" clip because it is shaped like the letter H. In particular, clip 128 includes first and second substantially parallel legs 130 and 132 and a third leg 134. Third leg 134 is substantially perpendicular to legs 130 and 132 and connects first leg 130 to second leg 132 at a midpoint of legs 130 and 132. Together legs 130, 132 and 134 define two pockets 136 and 138. First pocket 136 is defined between first and second legs 130 and 132 and to the right side or one of the sides of third leg 134. Second pocket 138 is defined between first and second legs 130 and 132 and to the left side or the opposing side of third leg 134.

First pocket 136 and second pocket 138 each include a plurality of grippers 140. In regards to first pocket 136, a plurality of grippers 140 are coupled to interior surfaces 142 and 144 of legs 130 and 132. More specifically, two grippers 140 are located on interior surface 142 of first leg 130 to the right side of third leg 134 and three grippers 140 are located on interior surface 144 of second leg 132 to the right side of third leg 134. In regards to second pocket 138, a plurality of grippers 140 are coupled to interior surface 142 and 144 of legs 130 and 132, respectively. More specifically, two grippers 140 are located on interior surface 142 of first leg 130 and three grippers 140 are located on interior surface 144 of second leg 132. Therefore, one of first pocket 136 and second pocket 138 and their grippers 140 mate with inner channel 124 of pillar 106. In particular, grippers 140 grip inner wall 126 between first leg 130 and second leg 132 of clip 128. In the embodiment illustrated in FIG. 7, grippers 140 in first pocket 136 grip inner wall 126 of inner channel 124. The grippers 140 in the other of the first pocket 136 or the second pocket 138 mate with a portion of a sign to hold the sign in place. The sign will be further discussed in detail below.

Figure 9:
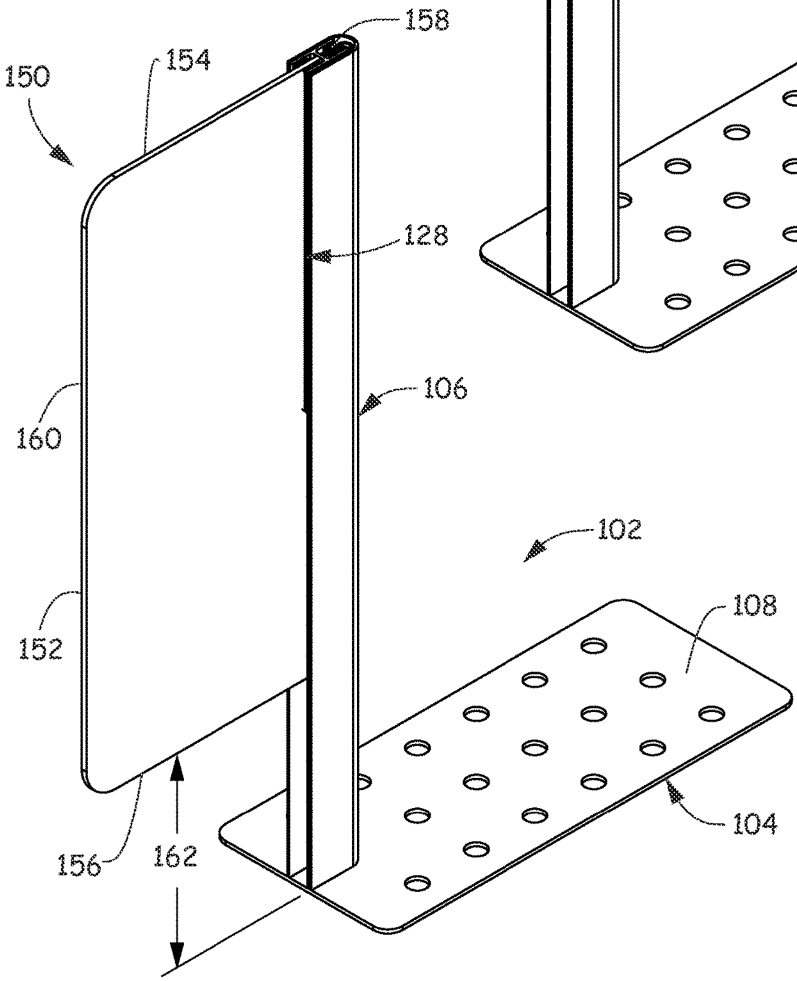
FIG. 9 is a perspective view of a graphic display assembly according to one embodiment.

FIG. 9 illustrates a graphic display assembly 150 according to one embodiment. In particular, FIG. 9 illustrates the support stand 102 including base 104 and pillar or elongated member 106 that houses clip 128 as shown in FIG. 8, but with clip 128 additionally retaining a portion of a sign 152 to form graphic display assembly 150. Sign 152 includes a top edge 154, a bottom edge 156, an inner edge 158 and an outer edge 160. A portion of sign 152 is retained by grippers 140 in second pocket 138 of clip 128, which mates with inner wall 126 of inner channel 124 of pillar 106. The portion of sign 152 that is retained by clip 128 includes a portion of inner edge 158. The remaining portion of inner edge 158 is located inside pillar 106. The remaining portion of sign 152 that is not retained by clip 128 extends outwardly from pillar 106 including a portion of top edge 154 and a portion of bottom edge 156 that is not inside pillar 106. Bottom edge 156 of sign 152 is spaced apart from top surface 108 of base 104 by a distance 162.

Figure 10:
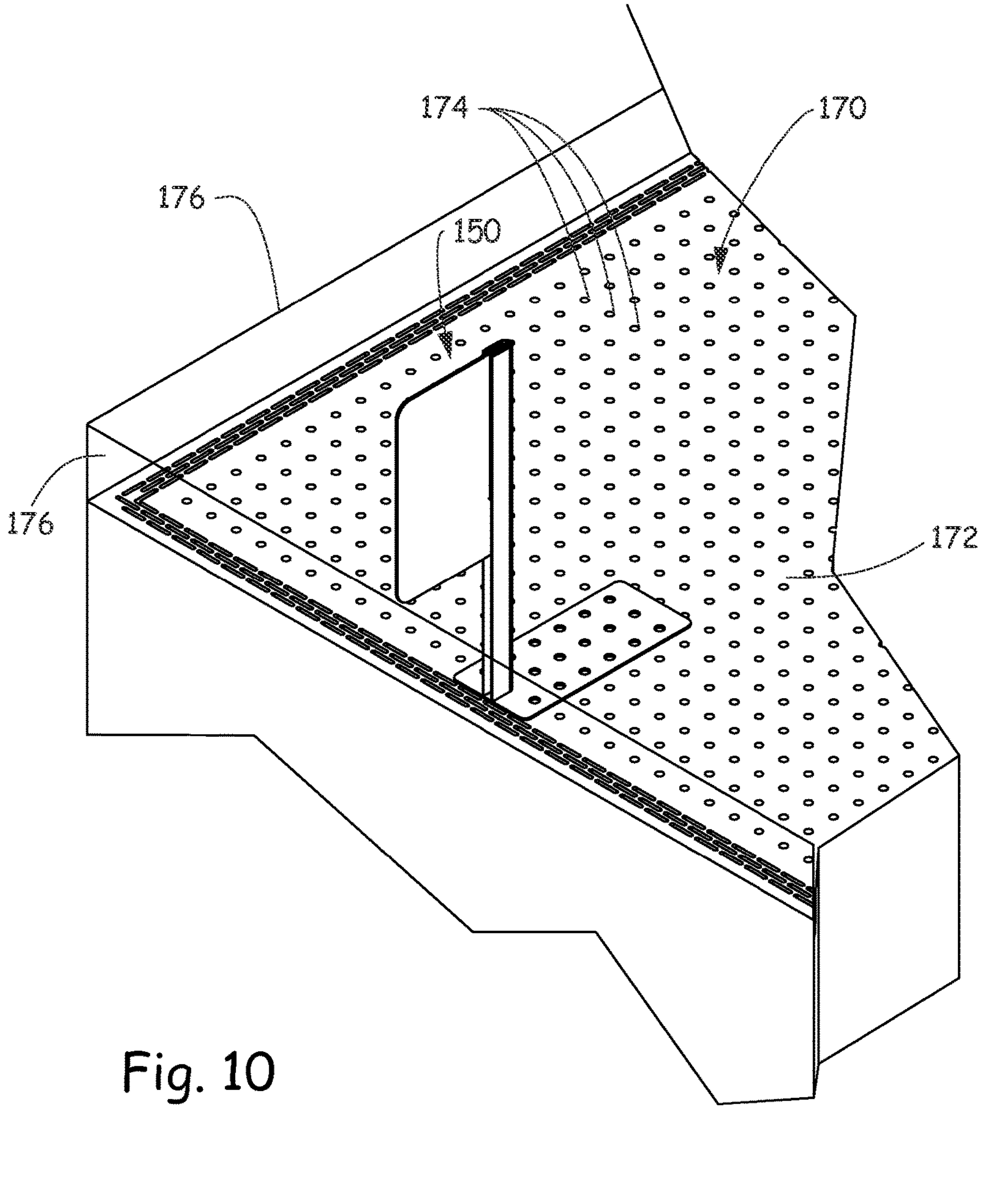
FIG. 10 is a perspective view of the graphic display assembly of FIG. 9 located in an open air refrigerator cooler display unit.

FIG. 10 is a perspective view of graphic display assembly 150 located in an open-air refrigerator cooler display unit 170. Open-air refrigerator cooler display unit 170 is for displaying perishable items for purchase by a customer and includes a table top 172 having a plurality of holes or nozzles 174 for delivering refrigerated air to table top 172. Open-air refrigerator cooler display unit 170 also includes side walls 176 that surround table top 172. Side walls 176 retain food and some of the cold air on table top 172 and prevent food from rolling off. As illustrated in FIG. 10, each of the plurality of spaced-apart holes 112 in base 104 of support stand 102 includes a diameter 113 (FIG. 7) that is substantially the same as the diameter of each of the plurality of holes or nozzles 174 in table top 172 of open-air refrigerator cooler display unit 170. In addition, the space 115 (FIG. 7) between holes 112 is uniform and substantially the same as the space between holes or nozzles 174. In this way, support stand 102 can be placed on table top 172 of open-air refrigerator cooler display unit 170 and the plurality of holes 112 in base 104 can be aligned with the plurality of holes or nozzles 174 in table top 172 so that support stand 102 does not interfere with cooling perishable items that are to be displayed on table top 172. In other words, the pattern of holes 112 in base 104 match the pattern of holes or nozzles in table top 172 so that the holes 112 and nozzles 174 are aligned so that base 104 does not interfere with the distribution of refrigerated air.

Figure 11:
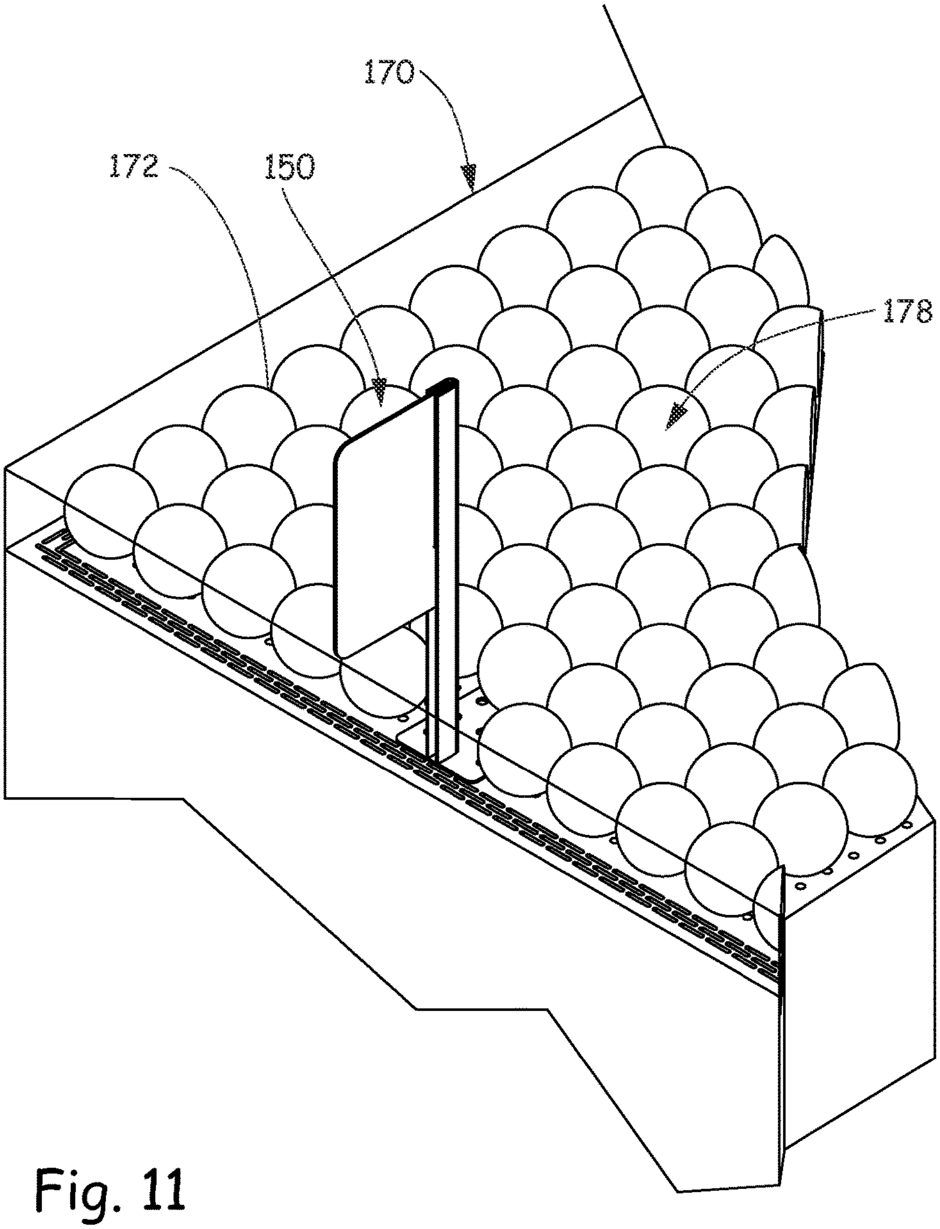
FIG. 11 is a perspective view of the graphic display assembly of FIG. 9 located in an open air refrigerator cooler display unit with perishable food.

FIG. 11 is a perspective view of graphic display assembly 150 located in open-air refrigerator cooler display unit 170 with perishable food 178. As illustrated, perishable food 178 is stacked on table top 172 and on base 104 of support stand 102. In this embodiment, perishable food 178 will be evenly cooled with the distribution of refrigerated air by holes or nozzles 174 including perishable food product 178 that is located on base 104 because the plurality of holes 112 in base 104 match holes or nozzles 174 and do not inhibit refrigerated air from passing through base 104 onto the perishable food product 178.

With reference to FIGS. 10 and 11, a method of altering open-air refrigerator cooler display unit 170 to include graphic display assembly 150 is provided. A portion of sign 152 is inserted into a portion of support stand 102. The portion of support stand 102 is a portion of pillar 106 and includes at least one elongated channel that holds clip 128. Therefore, the portion of sign 152 inserted into pillar 106 is inserted into a portion of clip 128. Clip 128 mates with inner channel 124 in pillar 106, which is partially defined by inner wall 126 and partially defined by outer wall 122 of pillar 106. To mate clip 128 with inner channel 124, grippers 140 are included on one end of clip 128 to grip inner wall 126 of inner channel 124. Further, clip 128 grips sign 152 with grippers 140 on another end of clip 128.

Support stand 102 is then placed on table top 172 of open-air refrigerator cooler display unit 170. The plurality of spaced-apart holes 112 in base 104 are aligned with holes or nozzles 174 in table top 172 so that refrigerated air can be delivered to table top 172 unimpeded. More specifically, the pattern of spaced-apart holes 112 in base 104 with the matching pattern of holes or nozzles 174 in table top 172. Therefore, perishable food, such as perishable food 178, can be placed on table top 172 and on or over base 104 and refrigerated air will continue to evenly cool the perishable food.

To ensure base 104 and its holes 112 remain aligned with the holes or nozzles 174 in tabletop 172, in one embodiment, holes 112 in base 104 can be configured to register with holes or nozzles 174 in tabletop 172 so that upon graphic display assembly 150 being knocked holes 112 remain in alignment with holes or nozzles 174 in tabletop 172. For example, bottom surface 110 of base 104 can include protrusions that fit into nozzles or holes 174, but do not interfere with the flow of refrigerated air. Exemplary protrusions could include rings that surround the diameter of holes 112 that are smaller in diameter than the diameter of holes or nozzles, but let air to pass through holes 112. Such registration would prevent inadvertent misalignment of holes 112 with holes or nozzles 174.

In addition, it should be further realized that graphic display assembly can be placed in any type of display bin as a freestanding sign display, not just in open-air refrigerated cooler units, to help customers discover what they are looking for and understand options. By having the sign freestanding above product displayed in a bin, the differences between product types can be better illustrated and recognized.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A graphic display assembly comprising:

a base having a top surface, a bottom surface and a plurality of spaced-apart holes extending through the base between the top surface and the bottom surface;

a pillar extending from the top surface of the base and having an outer wall that defines an outer elongated channel and an inner wall located inside the outer wall that defines an inner elongated channel;

a sign having a portion being held by the pillar and a remaining portion extending outwardly from the pillar, wherein the sign includes a bottom edge that is spaced apart from the top surface of the base; and a clip including a first pocket having a plurality of grippers and an opposing second pocket having a plurality of grippers, wherein the grippers in the first pocket mate with the inner wall of the pillar to hold the clip in place and wherein the grippers in the second pocket mate with a portion of the sign to hold the sign in place.

2. The graphic display assembly of claim 1, wherein the base comprises front and back ends and sides ends connecting the front and back ends so as to form a rectangular shape.

3. The graphic display assembly of claim 2, wherein the pillar extends from the top surface of the base adjacent the front end of the base.

4. The graphic display assembly of claim 1, wherein the inner elongated channel is partially defined by the inner wall of the pillar and partially defined by the outer wall of the pillar.

5. The graphic display assembly of claim 1, wherein the clip comprises an H-shaped clip containing first and second substantially parallel legs and a third leg that is substantially perpendicular to the first and second legs and connects the first leg to the second leg at a midpoint of the first and second legs, wherein the first, second and third legs define the first pocket that is on one side of the third leg and the second pocket that is on an opposing side of the third leg.

6. The graphic display assembly of claim 5, wherein the plurality of grippers are located on interior surfaces of the first and second legs and in the first and second pockets.

7. The graphic display assembly of claim 1, wherein the clip is an elongated clip having a height that is less than a height of the pillar.

8. A graphic display assembly comprising:

a support stand including a base having a top surface and a bottom surface and an elongated member that extends upwards from the top surface of the base and houses a clip, wherein the base further includes a plurality of spaced-apart holes extending through the base between the top surface and the bottom surface; and a graphic having a portion being retained by the clip in the elongated member and a remaining portion extending outwardly from the elongated member;

wherein the elongated member includes an outer wall defining an outer channel and an inner wall defining an inner channel; and wherein the clip includes a first pocket having a plurality of grippers and an opposing second pocket having a plurality of grippers, the grippers in the first pocket mate with the inner wall of the elongated to hold the clip in place and the grippers in the second pocket mate with the portion of the graphic retained by the clip to hold the graphic in place.

9. The graphic display assembly of claim 8, wherein the plurality of spaced-apart holes are arranged in a pattern that matches a pattern of holes in a tabletop of an open-air refrigerator cooler display that delivers refrigerated air to the display unit.

10. The graphic display assembly of claim 8, wherein each of the plurality of spaced-apart holes in the base comprise a substantially similar diameter and each diameter of each plurality of spaced-apart holes in the base is substantially the same as a diameter of each hole in a tabletop of an open-air refrigerator cooler display unit that delivers refrigerated air to the display unit.

11. The graphic display assembly of claim 8, wherein the inner channel is partially defined by the inner wall and partially defined by the outer wall of the outer channel.

12. The graphic display assembly of claim 8, wherein the clip comprises an H-shaped clip containing first and second substantially parallel legs and a third leg that is substantially perpendicular to the first and second legs and connects the first leg to the second leg, wherein the first, second and third legs define the first pocket that is on one side of the third leg and the second pocket that is on an opposing side of the third leg.

13. The graphic display assembly of claim 12, wherein the plurality of grippers are located on interior surfaces of the first and second legs and in the first and second pockets.

14. The graphic display assembly of claim 13, wherein the clip is an elongated clip having a height that is less than a height of the elongated member.

15. A method of altering an open-air refrigerator cooler display unit to include a graphic display assembly, the method comprising:

inserting a portion of a sign into a portion of a support stand, the support stand comprising:

a base having a top surface, a bottom surface and a plurality of spaced-apart holes extending through the base between the top surface and the bottom surface;

a pillar extending from the top surface of the base and having at least one elongated channel for receiving the portion of the sign;

placing the support stand on a table top of the open-air refrigerator cooler display unit; and aligning the plurality of spaced-apart holes in the base of the support stand with holes in the tabletop that deliver refrigerated air to the display unit so that perishable food that is placed on the table top and over the base of the support stand will continue to be evenly cooled.

16. The method of claim 15, wherein inserting the portion of the sign into the portion of the support stand comprises inserting the portion of the sign into a clip that is housed in the pillar.

17. The method of claim 16, wherein inserting the portion of the sign into the clip comprises mating the clip with an inner channel in the pillar that is partially defined by an inner wall and partially defined by an outer wall of an outer channel of the pillar.

18. The method of claim 17, wherein mating the clip with the inner channel comprises gripping the inner wall of the inner channel with grippers included on one end of the clip and further comprising gripping the sign with grippers included on another end of the clip.

19. The method of claim 14, wherein aligning the plurality of spaced-apart holes in the base of the support stand with holes in the tabletop that deliver refrigerated air to the display unit comprises aligning a pattern of the plurality of spaced-apart holes of the base with a matching pattern of holes of the tabletop that deliver refrigerated air to the open-air refrigerator cooler display unit.

* * * * *